(12) United States Patent
Wade et al.

(10) Patent No.: US 11,112,815 B1
(45) Date of Patent: Sep. 7, 2021

(54) FAULT ISOLATION AND RESTORATION SCHEME

(71) Applicant: Schweitzer Engineering Laboratories, Inc., Pullman, WA (US)

(72) Inventors: Austin Edward Wade, Moscow, ID (US); Dennis Haes, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/833,955

(22) Filed: Mar. 30, 2020

(51) Int. Cl.
*H02H 3/26* (2006.01)
*G05F 1/66* (2006.01)
*H02H 7/28* (2006.01)
*G06F 11/14* (2006.01)

(52) U.S. Cl.
CPC ............ *G05F 1/66* (2013.01); *G06F 11/1441* (2013.01); *H02H 3/265* (2013.01); *H02H 7/28* (2013.01)

(58) Field of Classification Search
CPC ............ H02H 7/22; H02H 7/20; H02H 7/261; H02H 7/26; H02H 1/0061; H02H 1/0007; H01H 47/002; H04L 41/0809
See application file for complete search history.

(56) References Cited

U.S. PATENT DOCUMENTS

| | | | |
|---|---|---|---|
| 6,867,958 | B2 | 3/2005 | McClure |
| 8,872,667 | B2 | 10/2014 | Bhageria |
| 9,733,659 | B2 | 8/2017 | Yang |
| 2014/0136006 | A1 | 5/2014 | Smit |
| 2018/0316175 | A1* | 11/2018 | Gubba Ravikumar ..................... H02H 1/0007 |

* cited by examiner

*Primary Examiner* — Bryan R Perez
(74) *Attorney, Agent, or Firm* — Bradley W. Schield

(57) ABSTRACT

Systems and methods to isolate faults and restore power are described herein. For example, an intelligent electronic device (IED) may receive a blocking signal indicating a fault is detected on a power line. The IED may obtain one or more current measurements of the power line. The IED may determine that a fault is not present on the power line at the IED based on the one or more current measurements. The IED may trip a first current interruption device of the IED The IED may send a close permissive signal to another IED indicating that the other IED is permitted to permitted to close an open current interruption device of the other IED to restore power to one or more loads.

17 Claims, 6 Drawing Sheets

FAULT ISOLATION AND RESTORATION SCHEME

TECHNICAL FIELD

The present disclosure relates generally to power system protection and, more particularly, to a scheme for detecting and isolating faults and restoring power to loads.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Power systems include equipment, such as generators, power lines, transformers, and the like, to provide electrical energy from sources to one or more loads. Protective devices may be installed in power systems to isolate faults to protect the remainder of the power system. For example, a protective device may trip a circuit breaker to disconnect a faulted power line. By isolating the fault, the fault may not affect the remaining power grid, which may allow operators to address the cause of the fault. Further, limiting the amount of the power grid disconnected due to the fault may allow for more equipment to remain in operation when available.

Commissioning and decommissioning protective devices on the power system may involve changing various settings to allow the protective devices to communicate with each other and operate such that the power system is protected. Further, some power systems may involve frequent changes to the equipment connected to the power system resulting in frequent commissioning and decommissioning of protective devices. The commissioning and decommissioning process may take significant amounts of time, resulting in downtime of the power system. Accordingly, there is a need to reduce the time taken in the commissioning and decommissioning process while enabling protective devices to isolate faults and restore remaining power to loads when available.

Figure 1:
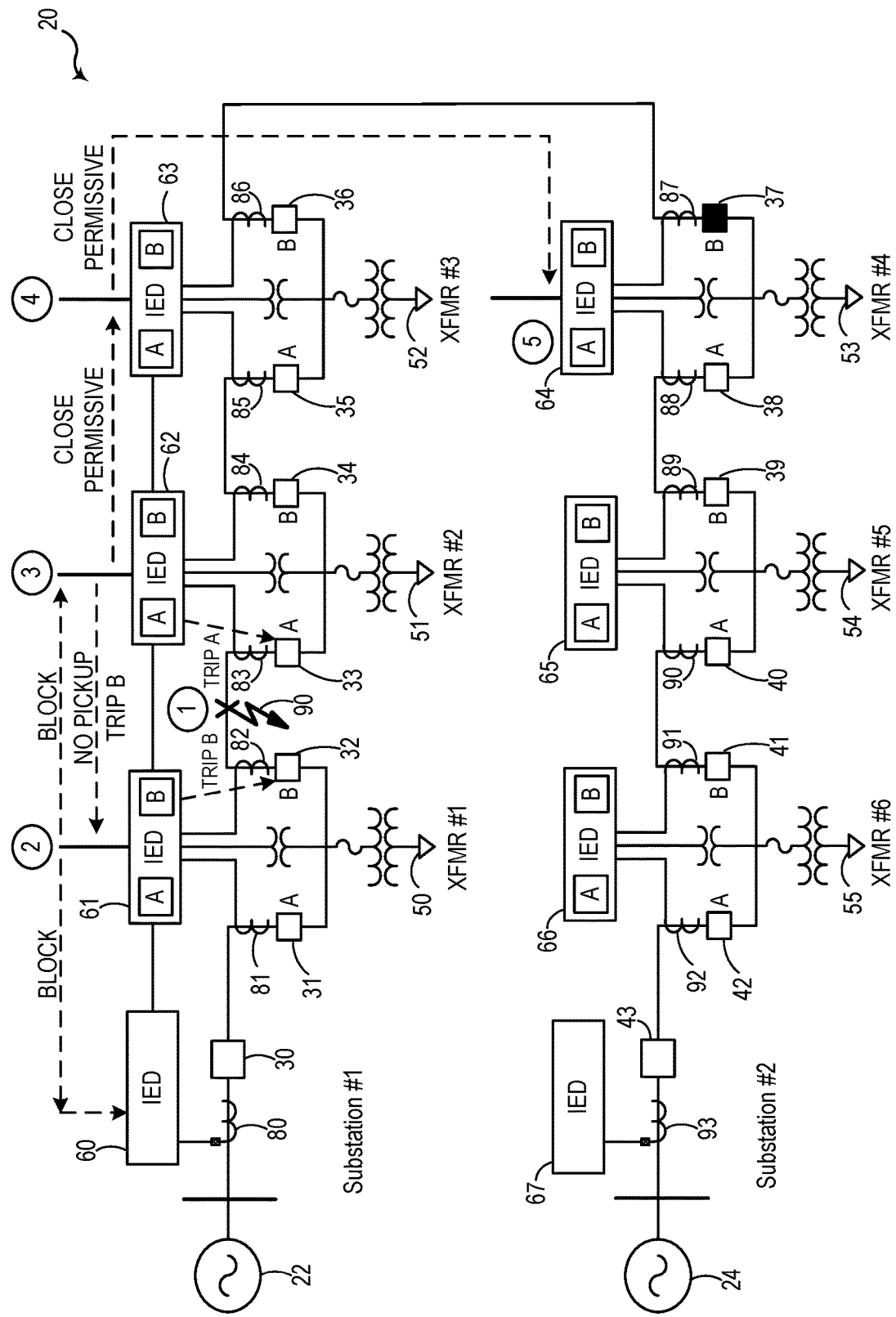
FIG. 1 is a one-line diagram of a power system with a fault detected and isolated using a fault isolation and restoration scheme, in accordance with an embodiment.

FIG. 1 is a one-line diagram of a power system 20 having a first power source 22 and a second power source 24, such as an electric generator, that provides power. Although illustrated as a one-line diagram for purposes of simplicity, the power system 20 may also be configured as a three-phase power system. The power sources 22 and 24 may be any generator capable of providing electric power to the electric power delivery system, and may include, for example, synchronous generators, turbines (such as hydroelectric turbines, wind turbines, gas-fired, coal-fired, and the like), photovoltaic electric generators, battery-powered generation, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

The power sources 22 and 24 may be selectively disconnected from or connected to one or more loads via current interruption devices, such as vacuum fault interrupter (VFI), circuit breakers (CBs) 30-43, or the like. In the illustrated embodiment, a first substation and a second substation may include power lines connections to various loads at locations between CBs 30-43. For example, the first substation may provide power to loads 50-52 and the second substation may provide power to loads 53-55. As illustrated, the CB 37 may be normally open and the remaining CBs 30-36 and 38-43 are normally closed.

The power system 20 may be protected by one or more intelligent electronic devices (IEDs). As used herein, an IED (such as IEDs 60-67) may refer to any microprocessor-based device that monitors, controls, automates, and/or protects monitored equipment within the power grid 20. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. The IEDs 60-67 may obtain electric measurements (e.g., current and/or voltage measurements) via analog signals from sensors 80-93, such as current transformers (CTs), potential transformers (PTs), Rogowski coils, voltage dividers, or the like. In other embodiments, the IEDs 60-67 may obtain digitized analog signals from merging units, which obtain electrical signals from the power system and communicate the digitized analog signals to the IEDs 60-67.

In the illustrated embodiment, the IEDs 60 and 61 may be utility feeder relays that monitor the current via the current sensors 80 and 93. The IEDs 60-67 may be communicatively connected to CBs 30-43 to perform protection and/or control operations on the power grid 20. Further, each of the IEDs 61-66 may be transformer protection relays that each monitor the power system 20 at two locations, labeled A and B.

If an event, such as a fault, were to occur on the power line between CBs 31 and 32 monitored by the IED 61, the IED 61 may detect a difference between current at CT 81 and current at CT 82 indicating that a fault is present between the CBs 31 and 32, referred to as differential protection. Further, if a fault 90 were to occur between CBs 32 and 33, as illustrated, the IED 61 may detect an increased current indicating that a fault is present. For example, the IED 61 may use overcurrent, time-overcurrent, or other forms of fault detection to detect the fault 90 due to the power source 22 providing energy to the fault 90. While these are used as examples, any suitable fault detection by the IEDs may be used.

Upon detecting a fault event, the IEDs 60-67 may communicate with each other to isolate the fault while limiting the loads disconnected. In the illustrated embodiment, the IED 61 may detect an overcurrent due to the power source 22 feeding energy to the fault 90. The IED 61 may detect the fault on both CT 81 and 82 indicating a through fault because the fault current is being delivered on the power line from the power source 22, through both CBs 81 and 82, to the fault 90.

The IED 61 may communicate that a fault was detected, via port A of the IED 61, to the IED 60 and communicate that the fault was detected, via port B of the IED 61, to port A of the IED 62. The IED 61 may receive the signal indicating that the neighboring IED 60 detected a fault. The IED 61 may not detect an overcurrent from a fault because the fault current is present on the power line between the power source 22 and the fault 90. Because the IED 61 detected a fault at CT 82 and the IED 62 did not detect a fault at CT 83, the IED 62 may send a signal to open the CB 33 to isolate downstream loads (e.g., loads 51 and 52) from the fault. Further, the IED 62 may communicate a trip permissive signal from port A of the IED 61 to port B of the IED 61. Upon receiving a trip permissive signal from the IED 62, the IED 61 may send a signal to open the CB 32, thereby isolating the fault 90 from the remaining power source 22 and load 50. Further, the IED 61 may send a feedback signal to the IED 62 indicating that the CB 32 is open.

Upon confirming that the fault 90 isolated from the feedback signal indicating opening of CB 32 and the IED 62 opening CB 33, the IED 62 may send a close permissive signal via port B to IED 63. The IED 63 may receive the close permissive signal from IED 62. The IED 63 may determine that both CBs 35 and 36 are closed and that there is no voltage present due to being disconnected from the power source 22. The IED 63 may then repeat the close permissive signal to the next neighboring IED 64. The IED 64 may receive the close permissive signal.

The IED 64 may determine that CB 37 is open and the power line has a healthy voltage from the power source 24. For example, each IED 61-66 may be communicatively connected to a potential transformer to monitor the voltage to the respective loads 50-55. The voltage may be determined as healthy when the voltage is measured as being within a desired voltage range with a desired frequency range. With the healthy voltage and CB 37 open, the IED 64 may issue a close command to CB 37, which restores power to loads 51 and 52, thereby limiting the loads disconnected due to the fault 90.

Figure 2:
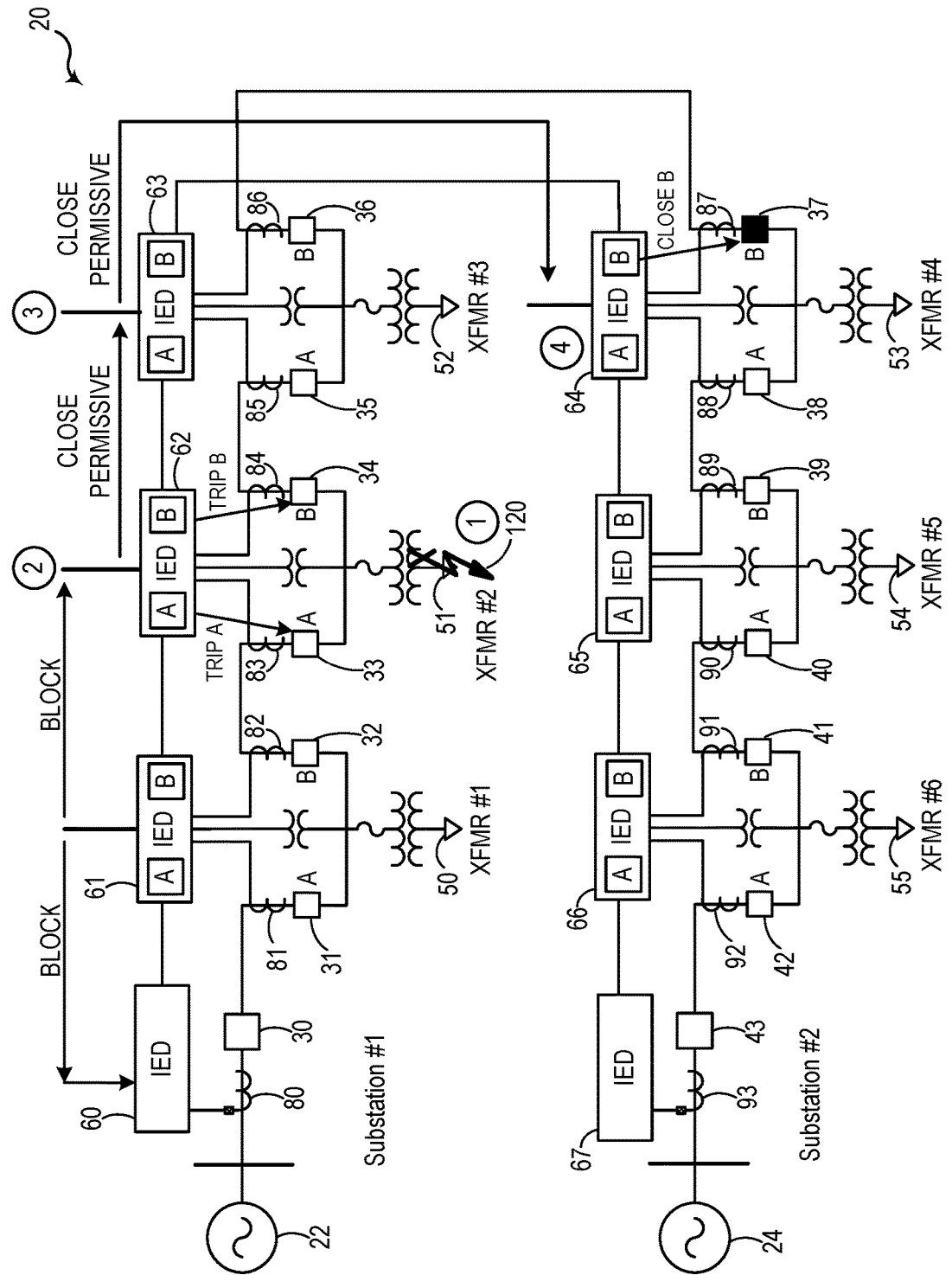
FIG. 2 is a one-line diagram of another fault in the power system of FIG. 1, in accordance with an embodiment.

FIG. 2 is an example of a fault between the monitored CBs 33 and 34. For example, in embodiments in which the IED 62 is a transformer protection relay, the fault may be located in or downstream of the connected transformer to load 51. In the illustrated embodiment of FIG. 2, the IED 61 may detect a through fault via CTs 81 and 82. The IED 61 may send a blocking signal indicating that a fault is detected to neighboring IEDs 60 and 62. The substation IED 60 may wait to trip on time overcurrent. The IED 62 may receive the blocking signal and determine whether a fault is present.

The IED 62 may detect an overcurrent at CT 83 without detecting an overcurrent at CT 84 indicating that a fault 120 is present on the transformer (e.g., the load 51) or on the transformer low side (side B of IED 62). The IED 62 may open CBs 33 and 34. Once the IED 62 receives feedback that the CBs 33 and 34 are open, the IED 62 may communicate a close permissive to IED 63. The IED 63 may repeat the close permissive signal to the next IED 64 based on the determination that the CBs 35 and 36 are closed and there is no voltage present. The IED 64 may determine that there is a CB 37 open and the power line has a healthy voltage (e.g., due to power source 24) indicating that the energized line can be used to power load 52. The IED 64 may close the CB 37 to restore power delivered to load 52.

Figure 3:
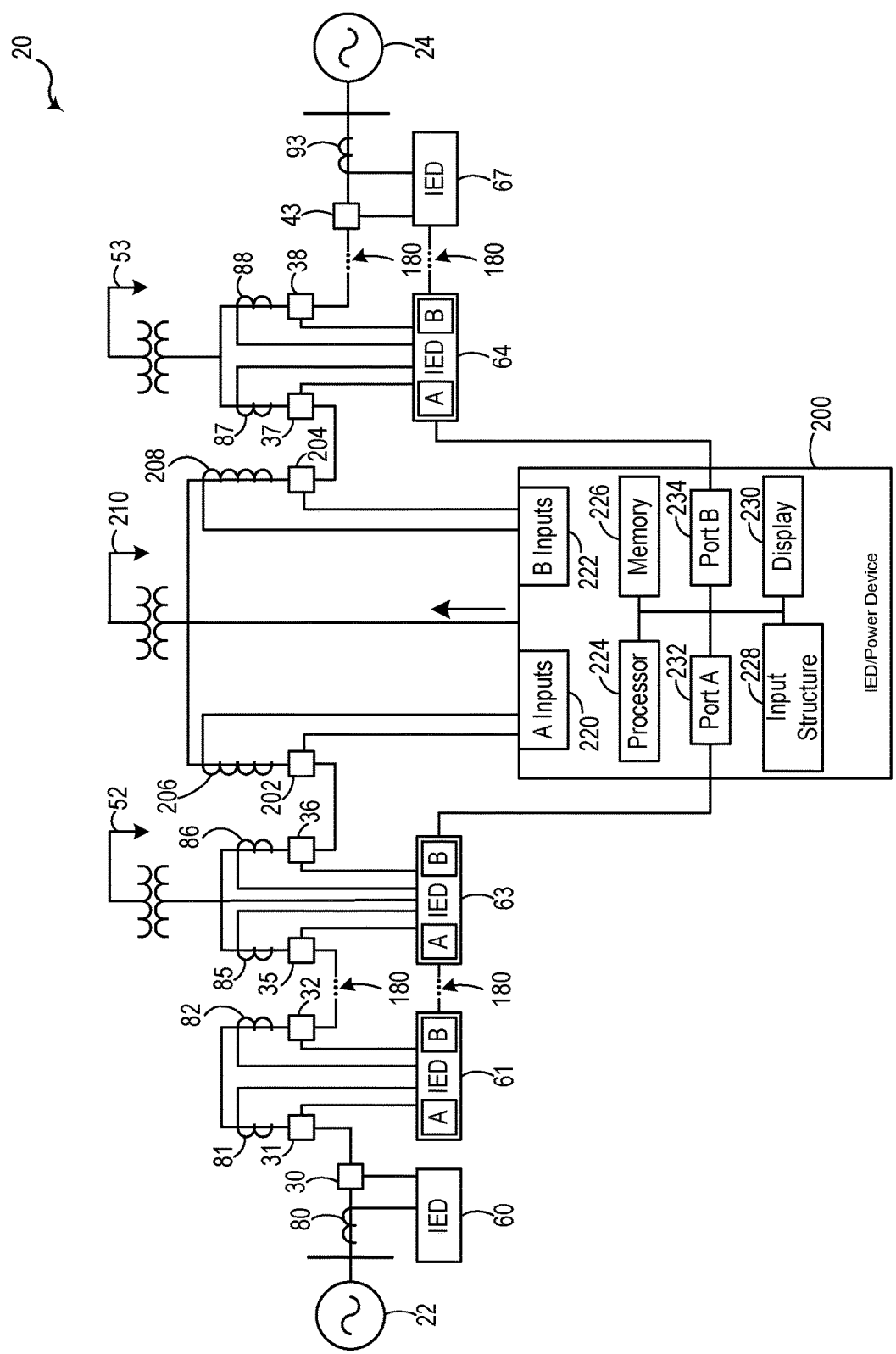
FIG. 3 is a block diagram of an IED in the fault isolation and restoration scheme of FIGS. 1 and 2, in accordance with an embodiment.

FIG. 3 is a functional block diagram of another IED 200 being inserted into the power system 20 between IEDs 63 and 64. Generally, the power system 20 may include end devices (e.g., IEDs 60 and 67) that are located in proximity of the power sources 22 and 24 IEDs 61-66 may bi-directionally communicate with devices upstream and downstream. As illustrated by ellipses 180, there may be any suitable number of devices/connections on the power system 20. Further, the number of connections/devices may vary during operation of the power system 20. That is, connections may be added or removed by commissioning/decommissioning onto the power system 20 and by adjusting connections of the IED without adjusting settings of the IED specific to the location in the power system 20.

The communication connections ports A 232 and B 234 may be any suitable communication connections, such as ethernet ports, serial ports, or a combination thereof, and may allow for bi-directional communication with both the upstream and downstream relay. For example, the IEDs may communicate IED status information using Mirrored Bits® communication over a serial communication port, commercially available from Schweitzer Engineering Laboratories of Pullman, Wash. The communication protocol may be independent of the communicating devices such that one relay may be swapped for another without changing communicated status information delivered between the devices (e.g., without header information identifying the IEDs).

Equipment on each side of the IED 200 may be associated with each other due to the relationship with respect to the load. For example, the A side of IED 200 may refer to the current sensor 206, the CB 202, and communication port A 232 which may be associated with being upstream of load 210, and the B side of IED 200 may refer to the current sensor 208, the CB 204, and communication port B 234 which may be associated with being downstream of load 52.

As illustrated, each communication port A may be connected to a port B of a neighboring IED, and each port B may be connected to a port A of a neighboring IED to allow for peer-to-peer communication between each neighboring IED Further, neighboring relays may repeat status information, such as blocking signals or permissive tripping/closing signals to subsequent devices until a device having the desired conditions is reached. For example, permissive close signals may be repeated until an IED with an open breaker and an energized bus is reached to cause the IED to close the breaker and restore power to disconnected loads.

In the illustrated embodiment, IED 200 may join the power system 20 between IED 63 and 64 to monitor additional loads being connected to the power system 20.

The IED 200 may be connected to CBs 202 and 204 and CTs 206 and 208 to monitor the current delivered to and leaving from the load 210. The IED 200 may include input ports A 220 and ports B 222 to communicably couple the IED to the CBs 202 and 204 and CTs 206 and 208.

The IED 200 may include one or more computer processors 224, a computer-readable storage medium 226, input structures 228, a display screen 230, and communication ports A 232 and B 234. The control system IED 200 may include one or more bus(es) 240 connecting the processor 224 or processing unit(s) to the computer-readable storage medium 226, the inputs 228, the display 230 and/or the communication port A 232 and B 234. The computer-readable storage medium 226 may be embodied as memory, such as random access memory (RAM), read only memory (ROM), or a combination thereof, and may include or interface with software, hardware, or firmware modules and/or executable instructions for implementing any of the processes of the systems and methods described herein.

The processor 224 may process inputs received via the A inputs 220 and B inputs 222 and the communication ports A 232 and B 234. The processor 224 may operate using any number of processing rates and architectures. The processor 224 may be configured to perform various algorithms and calculations described herein using computer executable instructions stored on computer-readable storage medium 226. The processor 224 may be embodied as a microprocessor. In certain embodiments, the processor 224 and/or the computer-readable storage medium 226 may be embodied as discrete electrical components, a general purpose integrated circuit, one or more Application Specific Integrated Circuits ("ASICs"), a Field Programmable Gate Array ("FPGA"), and/or other programmable logic devices. The processor 224 and/or the computer-readable storage medium 226 may be referred to generally as processing circuitry.

The IED 200 may include a display screen 230 that displays information to notify an operator of operating parameters of the power system 20, such as power generation, power consumption, current magnitude, circuit breaker status, etc. The input structures 228 may include buttons, controls, universal serial bus (USB) ports, or the like, to allow a user to provide input settings to the IED 200. In some embodiments, the display screen 230 may be a touch-screen display.

To monitor the added load 210 via the IED 200, the connection between IED 63 port B and IED 64 port A may be disconnected. The connection between port A 232 of IED 200 and port B of IED 63 may be established. Further, the connection between port B 234 of IED 200 and port A of IED 64 may be established.

In some embodiments, IEDs 61-66 and 200 may be substantially identical (e.g., same model, configuration, and settings) and may thus be interchangeable with each other without reconfiguring communication. For example, each of the IEDs 61-66 and 22 may expect to communicate messages to any device connected on ports A and B in which each device communicates according to the processes described in FIGS. 4 and 5.

Figure 4:
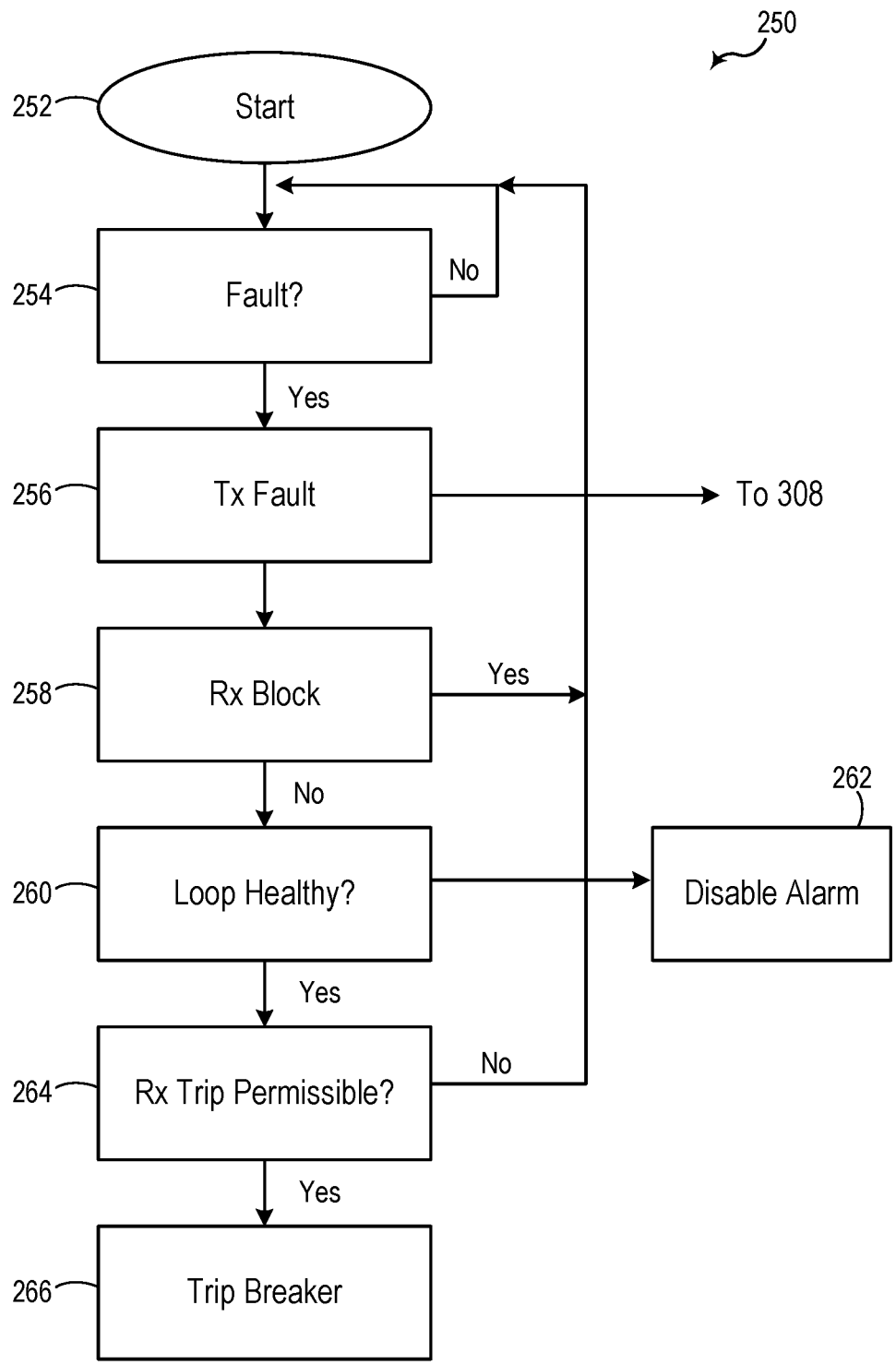
FIG. 4 is flow diagram of a process performed by an end device in the fault isolation and restoration scheme of FIGS. 1 and 2, in accordance with an embodiment.
Figure 5:
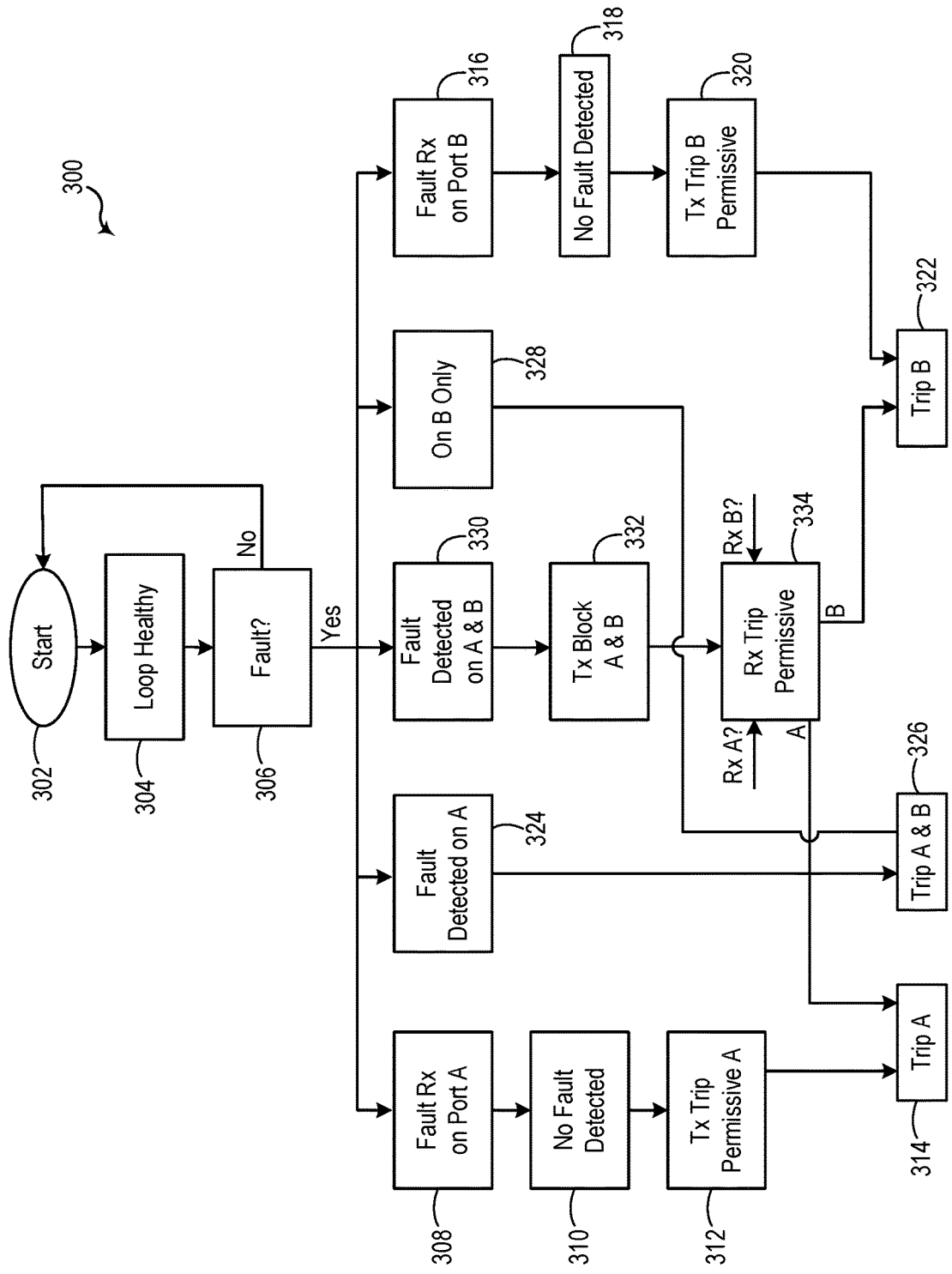
FIG. 5 is a flow diagram of a process performed by an intermediate device of the fault and restoration scheme of FIGS. 1 and 2, in accordance with an embodiment.
Figure 6:
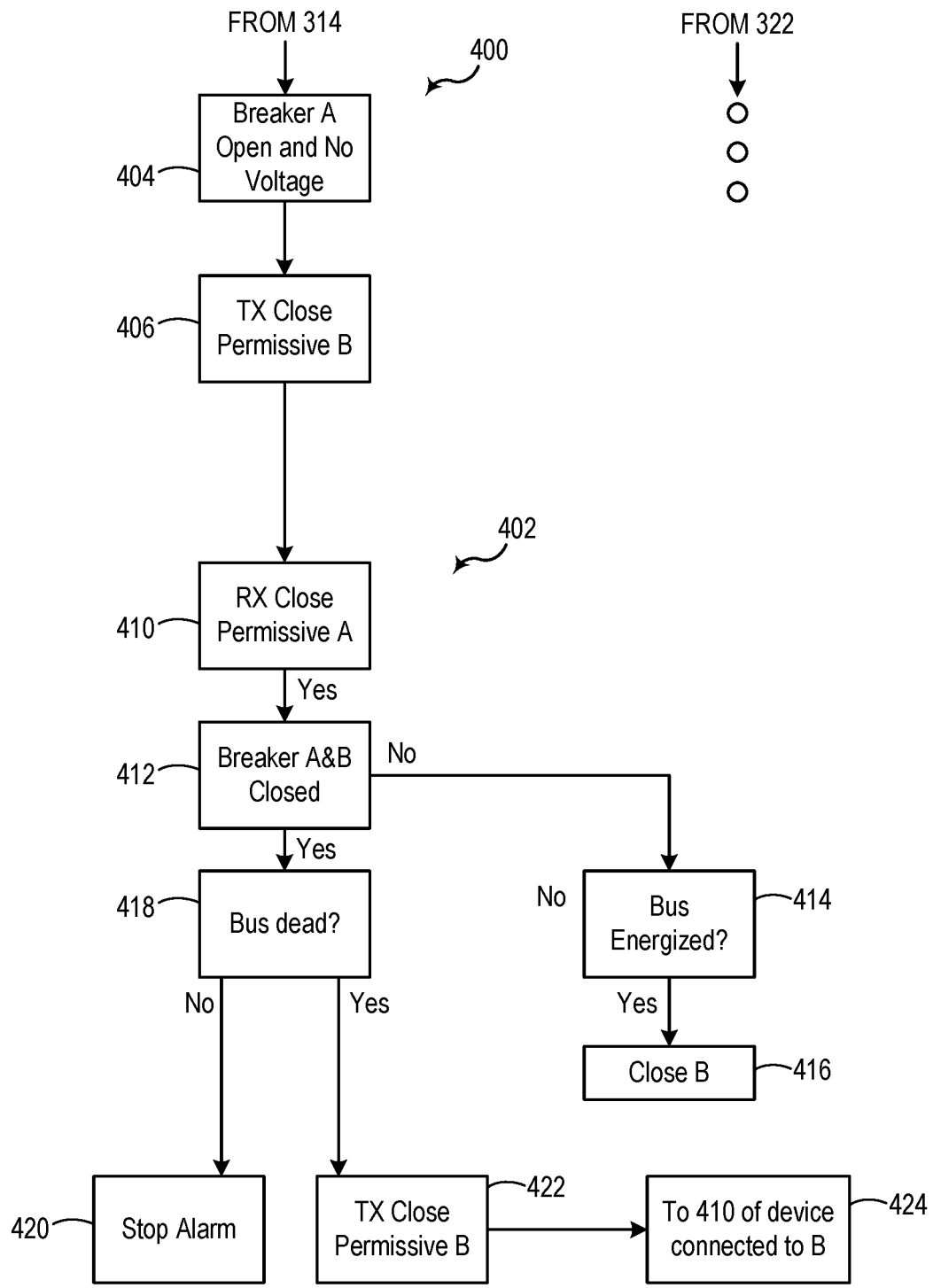
FIG. 6 is a flow diagram of a process to restore loads following isolation of a fault in the power system of FIGS. 1 and 2, in accordance with an embodiment.

FIGS. 4-6 are flow charts of control logic that may be used in the fault restoration and isolation scheme described herein. Executable instructions (e.g., code) may be stored in memory of the IEDs 60-67 and 200 to cause the IED 60-67 and 200 to perform the steps described below. Although FIGS. 4-6 are described in conjunction with IEDs 60-64, the processes may apply to any suitable device. Further, although the processes are described separately, in some embodiments, IEDs may be used as end devices, intermediate devices, or both, depending on the number and locations of connections to the device.

FIG. 4 is a flow chart of a process 250 that may be performed by an end device, such as IED 60 and 67. The IEDs 60 and 67 may start the process 250, for example, upon commissioning of the IEDs 60 and 67 onto the power system 20 (block 252). During the commissioning process, an operator may connect a port of the IED 60 and 67 to a port of another IED, such as IEDs 61 and 66. The IED 60 and 67 may then wait for a fault to occur (block 254). If an overcurrent is present on the power line indicating that a fault has occurred, the IED 60 may then transmit a blocking signal to IED 61 indicating the detection (block 256). The IED 60 may receive a blocking signal indicating that the IED 61 detects the fault or other subsequent IEDs detect the fault (block 258). If the IED 60 receives a blocking signal, that indicates that the fault can be isolated by IED 61 or another subsequent IED 62 or 63 and no action is taken. If the IED 60 does not receive a blocking signal, the IED 60 may determine whether the loop is healthy (block 260). That is, each of the IEDs 60-67 may communicate status with each other to ensure that each IED 60-67 is healthy and communicating. If the loop is not healthy, the IED 60 may disable the alarm (block 262). If the loop is healthy, the IED 60 may receive a trip permissive signal from the connected IED 61 (block 264). For example, if IED 61 does not detect a fault, the IED 61 may send a trip permissive signal to IED 60 indicating that IED 60 may proceeding with tripping. Because IED 60 detected a fault while the connected IED 61 did not detect a fault, it may be determined that the fault is located between IED 60 and IED 61. The IED 60 may trip the associated CB 30 and the IED 61 may trip the associated CB A 31 (block 266), thereby isolating the fault.

FIG. 5 is a flow chart of a process 300 that may be performed by an intermediate device between the two end devices, such as IEDs 61-66. In some embodiments, the same or substantially similar process 300 may be performed by each of the IEDs 61-66 to allow for connecting/disconnecting IEDs 61-66 without reconfiguration. That is, in certain embodiments, the IEDs 61-66 may perform the same routines independent of the location connected onto the power system 20. For example, IEDs 61-66 may be swapped, disconnected, or reconnected in any order or to monitor any of the loads. Additional devices may be added by adjusting the connections as described with respect to FIG. 3. Further, the IEDs 61-66 may be bidirectionally configured such that faults detected upstream or downstream operate in the same manner. For example, if a fault is detected on CT 33, the IED 62 may operate with respect to IED 61 using the same process as a fault detected on CT 34. In other embodiments, the devices may be configured individually depending on the application.

The process 300 may begin by commissioning the IED 62 onto the power system 20 (block 302). The IED 62 may proceed with monitoring the electrical characteristics, such as current and/or voltage, of the power line 20. The IED 61 and other IEDs 60 and 62-67 may continue to loop healthy in which each of the devices communicate status (e.g., a status bit) within the network to ensure that the network is operating (block 304). The IED 61 may then detect that a fault is present via the CTs 83 and 84, via communication port A and B, or a combination thereof (block 306). Depending on which of CTs 83 and 84 and communication ports A and B detect a fault, the IED 61, the IED 62 may perform different processes. If a fault is received on communication port A and no fault is detected (blocks 308 and 310), the IED 62 may send a trip permissive signal via communication port A to cause the IED 61 connected to port A to trip a CB (block 312). Further, the IED 62 may trip the CB A (e.g., CB 33) to isolate the fault from a subsequent restoration of power to loads 51 and 52 from closing CB 37 (block 314).

Similarly, if a signal indicating a fault is received on port B and no fault is detected at IED 62, it may be determined that the fault is located between CB 34 and CB 35 of IED 63 (blocks 316 and 318). The IED 62 may send a trip permissive signal to the connected IED 63 on port B indicating that IED 63 may trip the CB 35 (block 320). Further, the IED 62 may trip CB 34 to isolate the fault (block 322).

When a fault is detected on CT 33 but not on CT 34, the IED 62 may determine that the fault is located between the CTs 33 and 34, such as on the transformer 51 or transformer low side (block 324). The IED 62 may trip both CBs 33 and 34 to isolate the fault from power source 22 and to allow for restoration of load 52 from subsequently opening CB 37 (block 326). Similarly, when a fault is detected on CB 34 but not on CB 33, the IED 62 may determine that the fault is located between CTs 33 and 34 (block 328). For example, this may occur when power is being provided to load 51 from power source 24 following opening of CB 37. The IED 62 may then trip both CBs 33 and 34 to isolate the fault and to allow for potential restoration of any loads (block 326).

When a faulted is detected on CT 33 and 34, the IED 62 may determine that a through fault is present and may transmit a blocking signal to neighboring IEDs indicating that a fault has been detected (blocks 330 and 332). The IED 62 may then wait to receive a trip permissive signal from the neighboring IEDs 61 and 63. When a trip permissive signal is received from neighboring IED 61, the IED 62 may trip the associated CB 33, and when a trip permissive signal is received from neighboring IED 63, the IED 62 may trip the associated CB 34. If no trip permissive signal is received, the IED 62 may not trip a CB as the fault may be isolated by one or more IEDs closer to the fault.

FIG. 6 is a set of load restoration processes 400 and 402 that may be performed by the IEDs 62 and 63, respectively, following isolation of the fault (from block 314). A similar process may be performed to restore loads following tripping of the B breaker. The IED 62 may begin by confirming that the CB 33 is open and that no voltage is present on the power line (e.g., at load 51). The IED 62 may then transmit a close permissive signal via communication port B to attempt to restore power to load 51.

In process 402, port A of IED 63, which is connected to communication port B of IED 62 may receive a close permissive signal indicating that IED 63 may close any open CBs to restore power (block 410). The IED 63 may then determine whether CBs 35 and 36 are closed. If the CBs 35 and 36 are not closed and the bus is energized, then the IED 63 may close CB 36 to restore power to load 51 (blocks 414 and 416). If the CBs 35 and 36 are closed and the bus is energized, then the IED 63 may stop the alarm (blocks 418 and 420). If the CBs 35 and 36 are closed, and the bus is not energized, then the IED 63 may transmit a close permissive signal, via communication port B, to the subsequent IED 64.

The process 402 may then be repeated at IED 64. In the illustrated embodiment of FIG. 1, the IED 64 may determine that CB 37 is open and that the bus is energized (blocks 412 and 414). The IED 64 may then close CB 37 to restore power to the disconnected loads 51 and 52. Note that process 402 may be repeated to several IEDs depending upon the implementation.

By communicating blocking signals indicating faults and communicating trip or close permissive signals between IEDs 60-67, the power system 20 may quickly isolate faults and restore power to available loads. Further, because each device may communicate bidirectionally according to the same or similar processes described in FIGS. 4-6, IEDs for additional loads may be added or removed from reconnecting communication without reconfiguring the IEDs to communicate.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A first intelligent electronic device (IED), comprising:
    a first communication port associated with a first current sensor and a first current interruption device;
    a second communication port associated with a second current sensor and a second current interruption device;
    a memory; and
    a processor operatively coupled to the memory, wherein the processor is configured to execute instructions on the memory to cause operations comprising:
        receiving, via the first communication port, a blocking signal indicating a fault is detected on a power line;
        obtaining one or more current measurements of the power line;
        determining that a fault is not detected on the power line at the first IED based on the one or more current measurements;
        tripping the first current interruption device of the first IED; and
        sending, via the second communication port, a close permissive signal to a second IED indicating that the second IED is permitted to close a third current interruption device of the second IED in an open state to restore power to one or more loads.

2. The first IED of claim 1, wherein the processor is configured to execute instructions on the memory to cause operations comprising:
    waiting to confirm that the first current interruption device in fact tripped; and
    upon confirming that the first current interruption device in fact tripped, sending the close permissive signal.

3. The first IED of claim 1, wherein the processor is configured to execute instructions on the memory to cause operations comprising sending a feedback signal, via the first communication port, indicating that the current interruption device has tripped.

4. The first IED of claim 1, comprising a first circuit breaker as the current interruption device and a second circuit breaker as the second current interruption device.

5. A system, comprising:
a first current interruption device configured to control current flow on a power line; and
a first intelligent electronic device (IED), comprising:
  a memory; and
  a processor operatively coupled to the memory, wherein the processor is configured to execute instructions on the memory to cause operations comprising:
    receive, via a first input connected to a second IED, a first close permissive signal indicating that the first IED is permitted to close the current interruption device;
    determine that the first current interruption device is open and that a healthy voltage is present on the power line at the first IED; and
    close the first current interruption device to restore power to one or more loads of the second IED;
  wherein the process stored in the memory of the first IED is identical to the process stored in memory of the second IED to allow for easier connection or disconnection of IEDs, loads, or both from the power system.

6. The system of claim 5, comprising a second current interruption device, wherein the first current interruption device is associated with a first communication port of the IED and a first current sensor, and wherein the second current interruption device is associated with a second communication port of the first IED and a second current sensor of the IED, wherein the first IED monitors one or more loads between the first and second current sensors.

7. The system of claim 6, wherein the second current interruption device is a normally closed circuit breaker.

8. The system of claim 6, comprising the second IED, wherein the second IED comprises a third communication port associated with a third current interruption device and a fourth communication port associated with a fourth current interruption device, wherein the second IED is configured to:
  receive, via the third communication port, a second close permissive signal indicating that a third IED has isolated a fault from the power system;
  determine that the third current interruption device and the fourth current interruption device are closed and that a healthy voltage is not present; and
  send, via the fourth communication port, the first close permissive signal to the first IED.

9. The system of claim 8, comprising the third IED, wherein the third IED is configured to:
  detect a fault event;
  open a fifth current interruption device to isolate the fault from the power system; and send the second close permissive signal to the second IED.

10. The system of claim 5, wherein the first current interruption device is a normally open circuit breaker.

11. The system of claim 10, wherein the normally open circuit breaker is between a first power source on a first side and a second power source on a second side.

12. The system of claim 5, wherein the first IED comprises a voltage transformer configured to monitor voltage of the power line to determine whether the healthy voltage is present.

13. A system, comprising:
a first current interruption device configured to control current flow on a power line;
a second current interruption device configured to control current flow on the power line; and
a first intelligent electronic device (IED), comprising:
  a first current sensor;
  a first communication port associated with the first current sensor and the first current interruption device;
  a second current sensor;
  a second communication port associated with the second current sensor and the second current interruption device, wherein the first IED monitors one or more loads between the first and second current sensors;
  a memory; and
  a processor operatively coupled to the memory, wherein the processor is configured to execute instructions on the memory to cause operations comprising:
    receive, via a first input connected to a second IED, a first close permissive signal indicating that the first IED is permitted to close the current interruption device;
    determine that the first current interruption device is open and that a healthy voltage is present on the power line at the first IED; and
    close the first current interruption device to restore power to one or more loads of the second IED;
the second IED, comprising:
  a third communication port associated with a third current interruption device;
  a fourth communication port associated with a fourth current interruption device, wherein the second IED is configured to:
    receive, via the third communication port, a second close permissive signal indicating that a third IED has isolated a fault from the power system;
    receive, via the third communication port, a second close permissive signal indicating that a third IED has isolated a fault from the power system;
    determine that the third current interruption device and the fourth current interruption device are closed and that a healthy voltage is not present; and
    send, via the fourth communication port, the first close permissive signal to the first IED.

14. The system of claim 13, wherein the first current interruption device is a normally open circuit breaker.

15. The system of claim 14, wherein the normally open circuit breaker is between a first power source on a first side and a second power source on a second side.

16. The system of claim 13, comprising the third IED, wherein the third IED is configured to:
  detect a fault event;
  open a fifth current interruption device to isolate the fault from the power system; and send the second close permissive signal to the second IED.

17. The system of claim 13, wherein the first IED comprises a voltage transformer configured to monitor voltage of the power line to determine whether the healthy voltage is present.

* * * * *